June 22, 1926.
S. S. GORDON
1,589,753
TRAVELER FOR TEXTILE RINGS
Filed July 23, 1925
2 Sheets-Sheet 1
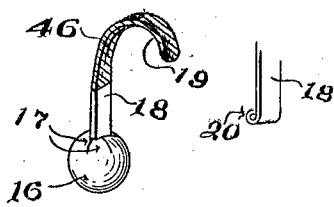
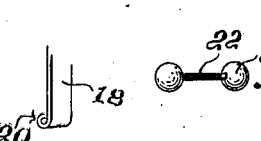
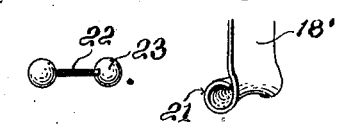
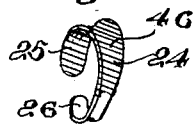
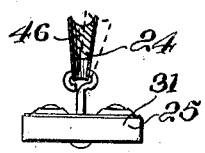
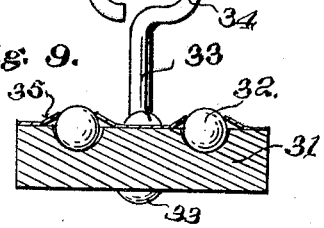
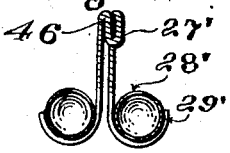
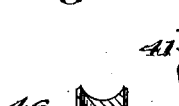
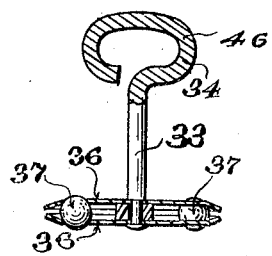
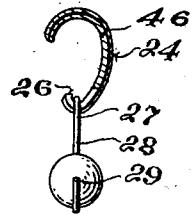
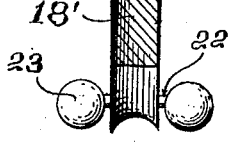
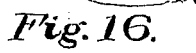
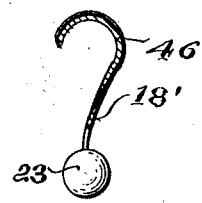
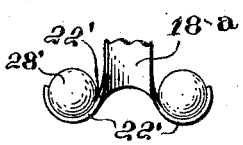
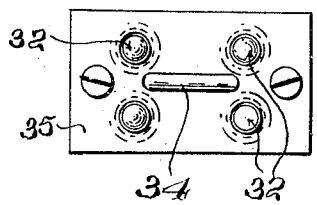
Inventor:
Samuel S. Gordon
By H. L. Woodward
Attorney June 22, 1926.

S. S. GORDON 1,589,753

TRAVELER FOR TEXTILE RINGS

Filed July 23, 1925

Inventor:
Samuel S. Gordon

By H.S. Woodward
Attorney

Patented June 22, 1926.

1,589,753

UNITED STATES PATENT OFFICE.

SAMUEL SEAVEY GORDON, OF PROVIDENCE, RHODE ISLAND.

TRAVELER FOR TEXTILE RINGS.

Application filed July 23, 1925. Serial No. 45,533.

The invention has for an object to provide an improvement in travelers for rings of the general type shown in my Patent No. 1,542,500, issued June 16th, 1925, particularly to the end of simplifying such devices while attaining improved function, aiming particularly to evolve novel structural details having peculiar advantages in such devices from manufacturing and utility standpoints.

Additional objects, advantages and features of invention reside in the construction, arrangement and combination of parts, all as will be understood from the following description, and accompanying drawings, wherein, Figure 1 is a perspective view of the traveler constructed in accordance with the invention.

Figure 2 is a detail of the stem element thereof.

Figure 3 is a detail of a modified form of traveler.

Figure 4 is a detail of the stem adapted to use with the structure of Figure 3.

Figure 5 is a detail of the upper section of a two-piece traveler, such as shown in Figures 7 and 8.

Figure 6 is a view of a modified construction of traveler.

Figure 7 is an elevational view of a two-piece traveler utilizing the upper element shown in Figure 5.

Figure 8 is an elevational view of a modified form of a two-piece traveler.

Figure 9 is an enlarged sectional view of the lower part thereof.

Figure 10 is a similar view of a further modification.

Figure 11 is a top view thereof, with the stem portion broken away.

Figure 12 is an elevational view of a traveler embodying the elements of Figures 3 and 4.

Figure 13 is a side view thereof.

Figure 14 shows an adaptation of the device of Figure 6 in production in sheet metal.

Figure 15 is a top view of the device of Figure 9.

Figure 16 is a fragmentary elevation of a further modification.

Figure 17 is a similar view of a still further modification.

Figures 10 and 11 and 15 to 23 are enlarged for convenience in showing details.

Figure 20:
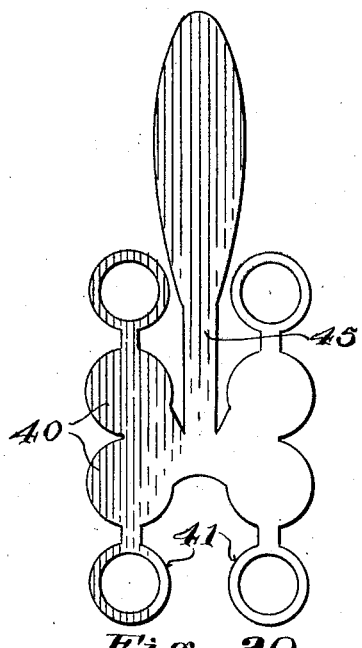
Figure 20 is a plan of a blank for a four-ball traveler employing the mounting and retainer of Figure 16.

There is illustrated in Figure 1 a traveler comprising a ball 16, which may be located below the slot of a ring of the general type shown in my referred-to application, various forms of which are known in the art, the ball being of the familiar sheet metal type pressed to form with the ears 17 of the original blank turned inwardly and fitted together at the upper part of the ball, tightly engaging around the lower part of the shank 18 of a traveler hook 19, the sides of which are bent backwardly from the bight of the hook so as to present a rounded surface for guidance of yarn, as is readily understood. The lower end of the shank 18 is provided with a bead or eye 20, by which it is securely retained against withdrawal from the ball 16. I also may use solid as well as hollow balls, and in either case they may be pinned, brazed or inserted, as will hereinafter appear. If desired, the lower part of the shank may be formed with an enlarged roll 21, shown in Figures 4 and 12, preferably enlarged or flared toward each side, and set in this may be the bar 22 of a lower section, balls 23 being secured on each end of the bar, the completed traveler being shown in Figures 12 and 13. This mounting gives a double bearing on the ring, while at the same time—owing to the manner in which the bar 22 is engaged with the traveler shank—a universal pivotal connection is attained, making for smooth operation of the traveler and efficient guidance of the yarn.

In Figures 5 and 7 a two-piece traveler is shown, in which the upper and lower parts also have relative pivotal movement. In this instance, the upper section 24 of the traveler is adapted to lie entirely above the ring while a fixed shank element is secured upon the ball to extend upwardly through the slot of the ring. The upper section 24 of this traveler comprises a large upper hook portion 25 and a lower small hook portion 26 which is engaged in the bight 27 of a wire frame having oppositely divergently downwardly extending arms 28, to the extremities of which there are affixed respectively the balls 29, eyes being formed in the ends of the arms 28 within the balls, to prevent casual withdrawal thereof.

In Figure 6 there is shown a mounting of two balls in a wire traveler element. This comprises a single length of wire bent at the middle to dispose the respective parts in close parallel relation, the parts adjacent the junction being bent to form together a suitable yarn receiving hook 27', while the extremities are bent oppositely outward in a plane at right angles to that of the hook 27' to snugly fit around respective balls 28' at the ends 29' of the wire stopping short of the upper parts of the balls, so as to only partly encircle them. The balls may be simply clamped within the ends of the wire, or may be secured by brazing or otherwise, as desired.

In Figures 8, 9 and 15 a further modification is shown in which a small block 31 or ball receiver of suitable material is provided, in the upper side of which there are set balls 32 exposed on the upper side of the block to afford a bearing against the under side of the spinning ring. Fixed centrally of the block there is a shank 33 having an eye 34 in the upper part, in which the element 24 of Figure 5 may be engaged, or other yarn-receiving element, although the yarn may be engaged directly through the eye 34, if desired. In the present instance, the block 25 is formed with semi-circular recesses and the balls 26 are of smaller diametrical dimension than the recesses, being retained by means of a very thin retainer plate 35 secured on the upper side of the block 25, apertured to receive the upper part of the balls therethrough as required.

In Figures 10 and 11 the traveler has a shank and eye 33 and 34 similar to that last mentioned, but the ball-bearing element of the traveler fixed on the lower tenoned end of the shank 33 comprises upper and lower receiver or retainer plates 36 having registered apertures therein at suitable intervals, the plates being spaced apart by means of a central washer and having interposed therebetween balls 37 of a size slightly larger than the apertures, so that the plates may fit together upon the balls with parts of the balls exposed through the apertures of the plates. The outer edges of the plates 36 are turned toward each other, as indicated, on lines immediately adjacent the balls, so that engagement of the plates with the spinning rings will be reduced to a minimum, or avoided. The block 31 and devices of Figures 10 and 11 preferably have more than two balls therein, so that at all positions of the device when rotating on the axis of the shank 33 balls will be engaged with the ring on both sides of the slot through which the shank projects when in use.

The balls 32 and 37 of Figures 9 and 10 may be loosely retained in the devices so that they may change their positions and thus bring new surfaces continually into engagement with the spinning ring, multiplying many times the life of the device and reducing replacement cost correspondingly. The same effect is attained with the devices of Figures 3, 4, 10, 11, 12, 16 and 17, to a large extent.

In Figure 14, the mounting of the balls after the manner of Figure 6, but using sheet metal for the mounting, is indicated. In this instance, the shank 18$^a$ may be formed at its upper part to receive the separate upper element of Figure 5, or may be formed like the members 18—18' of Figures 1 and 13. Its lower part is bifurcated and the two arms 22' thus formed given respective twists of a quarter turn at their bases, while their outer parts are curved to snugly receive the balls 28' as before indicated in connection with Figure 6.

In Figures 16 and 17 a further development of the use of sheet metal for mounting balls is shown, which may be considered preferable. In Figure 16 the blank for the shank is formed with enlargements at its lower part adapted to be twisted and pressed to form semi-circular cups 40 as required, to receive the balls 42 loosely. An integral annular ear 41 is formed on each enlargement, turned inwardly over the cup when formed, so as to retain the ball 42 with a part of the ball exposed therethrough for engagement with the ring, as will be understood. In Figure 17 the balls are retained in the cups by short tongues 43 formed on the edges of the cups and bent inwardly part way over the balls, as shown.

Figure 18:
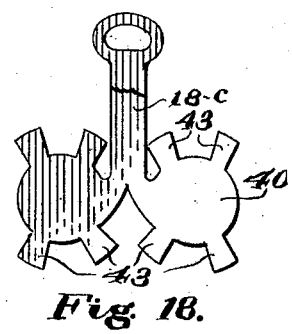
Figure 18 is a plan of the blank for the body of Figure 17.

Figure 18 shows the blank for the traveler body last described, and the shank thereof as well as all others described may be made short and provided with an eye, or may be lengthened and form with the yarn-hook, as preferred. The blank of the device of Figure 16 is similar to that in Figure 18, excepting that the retainers 41 are formed at one side of the cup bodies 40 after the manner shown in Figure 20, as will now be described.

Figure 21:
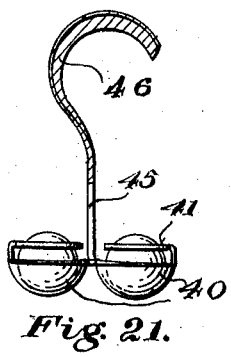
Figure 21 is a side view of the last mentioned traveler showing the yarn hook formed integrally with the ball mounting, although the shank may be formed as in Figures 17 and 18, if desired.

In Figures 20 and 21 the complete traveler excepting the balls is shown formed in one piece, adapted to carry four balls. The ball cup blanks are in pairs joined to respective sides of the stem 45, and the base of the stem is on a line extending medially between each pair, so that when bent at right angles to the plane of the blank at this line, the cups will be concentrically spaced about the stem. The retainers 41 are formed respectively on one side of each cup blank, and after forming of the cups and introduction of the balls the retainers may be turned over the balls to retain the latter as in Figures 16 and 21.

Figure 22:
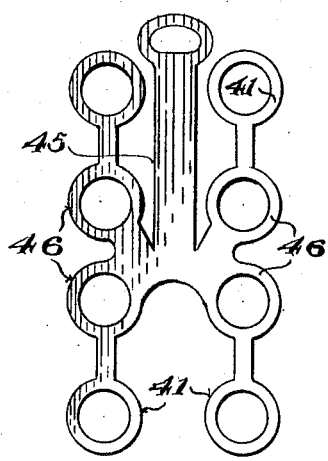
Figure 22 is a plan of blank for a still further modification of ball mounting adapted to be formed integrally with the shank from sheet metal.
Figure 19:
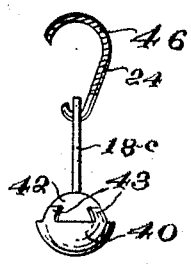
Figure 19 is a side elevation of the device of Figure 17 used with the separate upper section 24.
Figure 23:
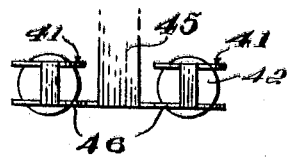
Figure 23 is a fragmentary elevation of the last mentioned form modification, formed and assembled.

In Figures 22 and 23 a mounting is indicated by which the balls may be exposed both above and below, utilizing the principle involved in the blank of Figure 20. In this instance, two rings 46 similar to the retainers 41 are formed in the blank in place of the cups, the formation being otherwise in accordance with the preceding description.

The parts may be variously proportioned to meet requirements and the relative sizes of the hook, shanks and cups are not arbitrary or accurately dimensioned for all uses, as shown in the drawings. The shanks may be made longer or shorter to suit the thickness of the rings with which the device is used. The elements are shown much larger than they need be in actual practice.

It is an advantage of the construction shown and it is a part of the invention, to coat all of the yarn hook elements with porcelain, as at 46 in the figures, which may be applied as usual in the application of porcelain to metal objects. This obviates the need for special treatments or tumbling to round off the edges of the blanks and also obviates the liability of excessive wear of yarn by surface inequalities, burrs developed in manufacture, faults in the metal, and other causes. After coating with porcelain, the parts at once have highly polished surfaces and nicely rounded parts at all meeting faces so coated, in addition to which the porcelain is extremely resistant to wear and adapted to give long service before requiring replacement.

The article as presented is adapted to be manufactured at a very low cost, and by enabling the combination of an anti-friction device in the ring engaging parts with a wear resisting yarn hook, gives preeminent efficiency in eliminating friction where desirable, and long service in a compact form.

I claim:

1. In a traveler a lower shoe element comprising a ball and a ball-embracing portion, and a traveler hook connected with the shoe.

2. The structure of claim 1 in which the shoe element of the traveler comprises a ball retainer element having portions of the ball exposed therethrough and adapted to permit changing of positions of the balls.

3. The structure of claim 1 in which the shoe comprises a shank having a furcated lower part, and respective balls, the furcations being bent outwardly and upwardly around the balls.

4. An improved traveler for textile rings comprising a ring engaging portion and a yarn receiving part, said yarn receiving part having a vitreous coating thereover.

5. The structure of claim 1 in which the shoe comprises a sheet metal member including a shank, lower broadened parts turned outward from the shank and shaped to form a cage part to hold a ball partly projected therefrom and loosely movable therein.

6. A shoe for travelers comprising a blank of sheet metal dished and having extensions on the edge inturned to retain a ball therein, and a ball in the dished part.

7. The structure of claim 6 in which the extensions are in the form of an annulus inturned from its base to lie over a ball in the dished part.

In testimony whereof I affix my signature.

SAMUEL SEAVEY GORDON.